US008965543B2

(12) United States Patent
Han

(10) Patent No.: US 8,965,543 B2
(45) Date of Patent: Feb. 24, 2015

(54) ELECTRONIC DEVICE AND METHOD OF EXECUTING APPLICATION USING THE SAME

(75) Inventor: Sang Youn Han, Seoul (KR)

(73) Assignee: LG Electronics Inc., Seoul (KR)

( * ) Notice: Subject to any disclaimer, the term of this patent is extended or adjusted under 35 U.S.C. 154(b) by 1057 days.

(21) Appl. No.: 12/053,524

(22) Filed: Mar. 21, 2008

(65) Prior Publication Data

US 2008/0234849 A1 Sep. 25, 2008

(30) Foreign Application Priority Data

Mar. 23, 2007 (KR) ........................ 10-2007-0028510

(51) Int. Cl.
*G06F 17/00* (2006.01)
*H04N 7/14* (2006.01)
*G11B 27/10* (2006.01)
*G11B 27/32* (2006.01)
*G11B 27/34* (2006.01)

(52) U.S. Cl.
CPC .............. *H04N 7/147* (2013.01); *G11B 27/105* (2013.01); *G11B 27/322* (2013.01); *G11B 27/34* (2013.01)
USPC .......................................................... 700/94

(58) Field of Classification Search
CPC ................... G06F 2203/04808; G06F 3/0482; G06F 3/0485; G06F 3/0486; G06F 3/0488; G11B 27/031
USPC .......................................................... 700/94
See application file for complete search history.

(56) References Cited

U.S. PATENT DOCUMENTS

| 6,690,778 | B2 * | 2/2004 | Kahn ........................ 379/110.01 |
| 7,774,708 | B2 * | 8/2010 | Bell et al. ........................ 715/738 |
| 7,930,650 | B2 * | 4/2011 | Brodersen et al. ............. 715/838 |
| 2002/0175931 | A1 * | 11/2002 | Holtz et al. .................... 345/716 |
| 2003/0112262 | A1 * | 6/2003 | Adatia et al. .................. 345/716 |
| 2004/0230916 | A1 * | 11/2004 | Salvatori et al. .............. 715/810 |

(Continued)

FOREIGN PATENT DOCUMENTS

| CA | 2605099 | 11/2006 |
| CN | 1744689 | 3/2006 |

(Continued)

OTHER PUBLICATIONS

Microsoft Corp., "Add or Edit Media Information," Windows Media Home—Knowledge Center, Oct. 2006.

(Continued)

*Primary Examiner* — Andrew C. Flanders
(74) *Attorney, Agent, or Firm* — Lee, Hong, Degerman, Kang & Waimey

(57) ABSTRACT

An electronic device and a method of setting control information using the same are provided. The method includes displaying an application, which includes a plurality of media items that are reproducible according to individually adjustable control information; identifying one of the plurality of media items for which associated adjustable control information is to be adjusted responsive to a first user input; displaying a control region including at least one user-definable control parameter individually defining the adjustable control information associated with the identified one of the plurality of media items; and adjusting the adjustable control information associated with the identified one of the plurality of media items responsive to a second user input.

14 Claims, 20 Drawing Sheets

(56) References Cited

U.S. PATENT DOCUMENTS

| | | |
|---|---|---|
| 2006/0026521 A1* | 2/2006 | Hotelling et al. .............. 715/702 |
| 2006/0161871 A1* | 7/2006 | Hotelling et al. .............. 715/863 |
| 2008/0036743 A1* | 2/2008 | Westerman et al. .......... 345/173 |
| 2008/0066016 A1* | 3/2008 | Dowdy et al. ................. 715/854 |
| 2008/0122796 A1* | 5/2008 | Jobs et al. ..................... 345/173 |
| 2008/0154407 A1* | 6/2008 | Carson ............................ 700/94 |

FOREIGN PATENT DOCUMENTS

| | | |
|---|---|---|
| KR | 10-0664148 | 1/2007 |
| KR | 10-0687270 | 2/2007 |
| WO | 2006-059957 | 6/2006 |

OTHER PUBLICATIONS

Korean Intellectual Property Office Application Serial No. 10-2007-0028510, Notice of Allowance dated Jan. 22, 2014, 2 pages.

Korean Intellectual Property Office Application Serial No. 10-2007-0028510, Office Action dated Aug. 29, 2013, 3 pages.

* cited by examiner

ELECTRONIC DEVICE AND METHOD OF EXECUTING APPLICATION USING THE SAME

CROSS-REFERENCE TO RELATED APPLICATIONS

Pursuant to 35 U.S.C. §119(a), this application claims the benefit of earlier filing date and right of priority to Korean Application No. 10-2007-0028510, filed on Mar. 23, 2007, the contents of which are hereby incorporated by reference herein in their entirety.

FIELD OF THE INVENTION

The present invention relates to an electronic device and a method of executing an application using the same.

DESCRIPTION OF THE RELATED ART

As the demand for mobile terminals has increased rapidly, more diverse services and functions are provided in the mobile terminals. The services and functions include transmitting and receiving messages, taking pictures or motion pictures, reproducing MP3 files, and video telephony.

For example, a plurality of image files or a plurality of music files can be displayed or reproduced through an image or music application of the mobile terminals. In conventional mobile terminals, when a plurality of the music files is reproduced through the music application, the same control information, such as volume setting, is applied to all of the music files to be reproduced.

Therefore, in the conventional mobile terminals, the user controls the volume only while the music file is being reproduced in order to set the volume of music reproduced from a music file through the music application. Once the volume of the music application has been set, the set volume is applied identically to all of the music files reproduced through the same music application. In other words, the volume of all of the reproduced music files is set equally according to the previously set volume. Accordingly, if the user wants to listen to certain music at a volume different from the volume of the previously reproduced music file, the user needs to adjust the volume of the music application each time a new music file is reproduced.

SUMMARY OF THE INVENTION

An aspect of the present invention is to provide a method for setting control information in an electronic device, the method including displaying an application including a plurality of media items that are reproducible according to individually adjustable control information, identifying one of the plurality of media items for which associated adjustable control information is to be adjusted responsive to a first user input, displaying a control region comprising at least one user-definable control parameter individually defining the adjustable control information associated with the identified one of the plurality of media items, and adjusting the adjustable control information associated with the identified one of the plurality of media items responsive to a second user input.

The second user input may include a graphic input or numeric input. The control parameter may be displayed as a graphic or a numeric value. The plurality of media items includes at least one of an image file and an audio file. Multiple control parameters may be displayed in a single control region.

The control region may be displayed in response to user contact with a predefined region on the display. The second user input may be contact with a predefined icon displayed with the plurality of media items. The predefined icon may be a symbol, a drawing, or a picture. The second user input may also be dragging the predefined icon in a predetermined direction and the adjustable control information is adjusted according to a dragged distance of the predefined icon. For example, the second user input may be dragging the predefined icon in up and down directions to adjust first adjustable control information and dragging the predefined icon in left and right directions to adjust second adjustable control information.

The method may further include displaying a guide for indicating a degree of the at least one control parameter when the predefined icon is dragged. The method may further include displaying the plurality of media items and their associated control parameters such that the at least one control parameter differs from a default control parameter.

The adjustable control information includes at least one of display information, sound information, and order information. The display information includes a display size, a display type, and a resolution; the sound information includes a volume and a sound effect mode; and the order information includes a number of times for reproducing the plurality of media items, an order of executing the application, and information about whether the media item will be reproduced by the application.

The control region may be displayed such that it overlays the displayed application. The method may further include saving the adjusted control information. The method may further include reproducing the identified one of the plurality of media items according to the adjusted control information.

Another aspect of the invention is to provide a method for setting control information in an electronic device, the method including displaying an application including a plurality of media items that are reproducible according to individually adjustable control information, displaying a separate control region for each of the plurality of media items, wherein each of a plurality control regions comprises at least one user-definable control parameter individually defining the adjustable control information associated with one of the plurality of media items, and adjusting the adjustable control information associated with one of the plurality of media items responsive to user input.

The user input may be dragging the at least one control parameter and the adjustable control information is adjusted according to a dragged distance of the at least one control parameter. The method may also include displaying a guide for indicating a degree of the at least one control parameter when the at least one control parameter is dragged. The user input may also be a numeric value for the at least one control parameter. The numeric value may be input by writing directly on the displayed control region. The method may also include reproducing the plurality of media items according to most recently adjusted control information.

Yet another aspect of the present invention is to provide an electronic device including a display unit for displaying an application including a plurality of media items that are reproducible according to associated individually adjustable control information, an input unit for receiving user input, and a control unit for adjusting the adjustable control information associated with each of the plurality of media items according to the user input and executing the application to reproduce each of the plurality of media items according to the associated individual adjustable control information.

The electronic device may also include a memory unit for storing the individual adjustable control information associated with each of the plurality of media files. The display unit may be a touch screen displaying at least one indicator, and the user input may be a sensory touch of the at least one indicator displayed on the touch screen. In the electronic device, each of the plurality of media items is reproduced according to default control information if the associated adjustable control information is not adjusted.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
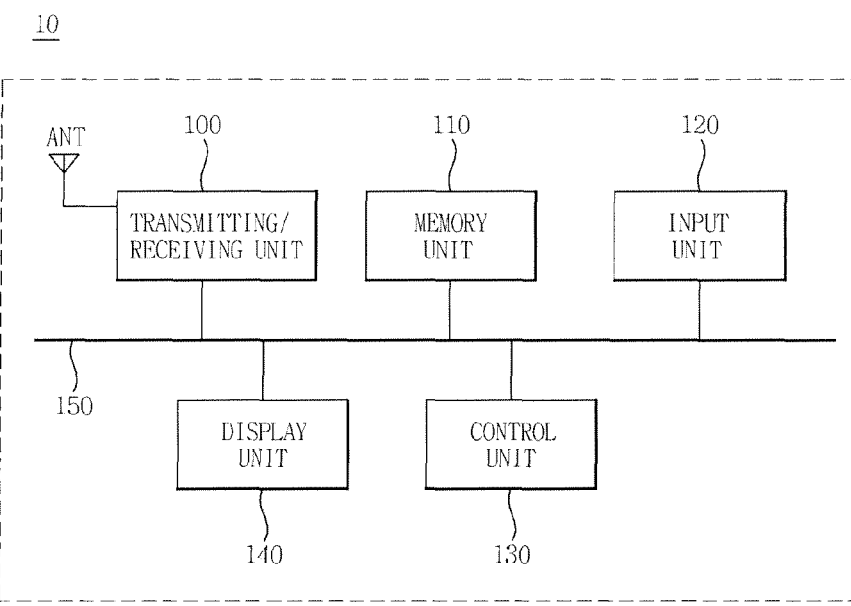
FIG. 1 is a block diagram illustrating an electronic device according to an embodiment of the present invention.

As shown in FIG. 1, the present electronic device may be a mobile terminal 10. The mobile terminal 10 includes a transmitting/receiving unit 100, a memory unit 110, an input unit 120, a control unit 130, and a display unit 140. These components are connected to each other through a bus 150.

The transmitting/receiving unit 100 receives applications, such as music files, image files, and the other party's image files during video telephony by communicating with a base station through an antenna ANT.

The memory unit 110 may be, for example, a flash memory, a random access memory (RAM), or an electrically erasable programmable read only memory (EEPROM). The memory unit 100 stores a program that generally controls operations of the mobile terminal 10. The memory unit 110 also stores various applications to reproduce files, such as music files and image files, and stores first and second control information set for each application. The first and second control information will be described later.

The input unit 120 includes numeral keys and various function keys. The input unit 120 changes the first control information of a predetermined application among a plurality of applications stored in the memory unit 110 to the second control information.

The control unit 130 controls input/output of the mobile terminal 10. If the control information of a predetermined application among a plurality of the applications displayed on the display unit 140 is changed, the control unit 130 controls applications according to the changed control information. That is, the control unit 130 executes the predetermined application, of which the control information has been changed through the input unit 120, according to the changed control information or second control information. And, the control unit 130 controls other applications to be executed according to the first control information.

The display unit 140 is set to display various information signals received from the transmitting/receiving unit 110 and a plurality of applications stored in the memory unit 110 according to the first control information.

Figure 2:
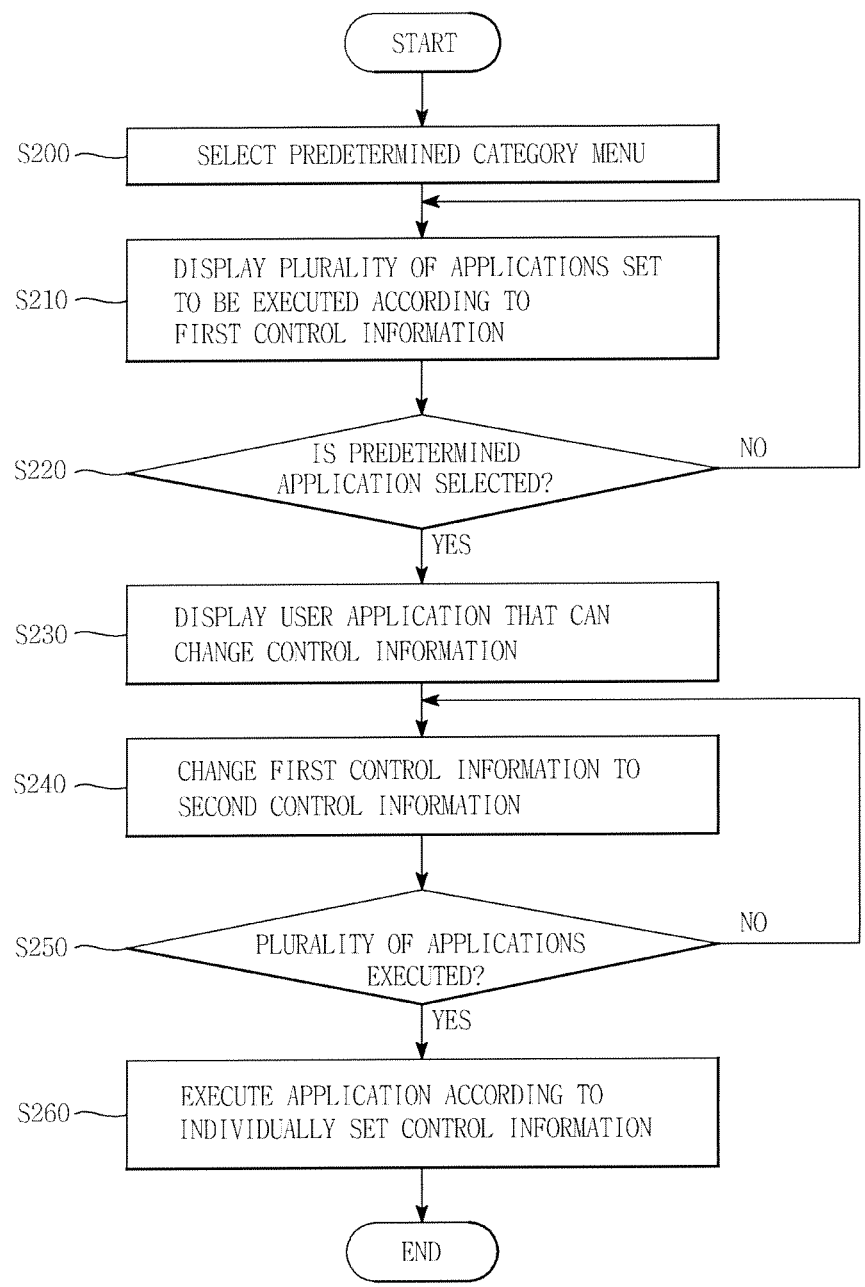
FIG. 2 is a flowchart illustrating a method of executing applications using an electronic device according to the present invention.

As shown in FIG. 2, a method of executing applications using an electronic device according to the present invention includes steps S200 and S210 for displaying a plurality of applications set to be executed according to the first control information, steps S220 to S240 for changing control information of a predetermined application among a plurality of the applications to second control information, and steps S250 to S260 for executing the predetermined application according to the second control information and executing other applications according to the first control information.

Figure 3A:
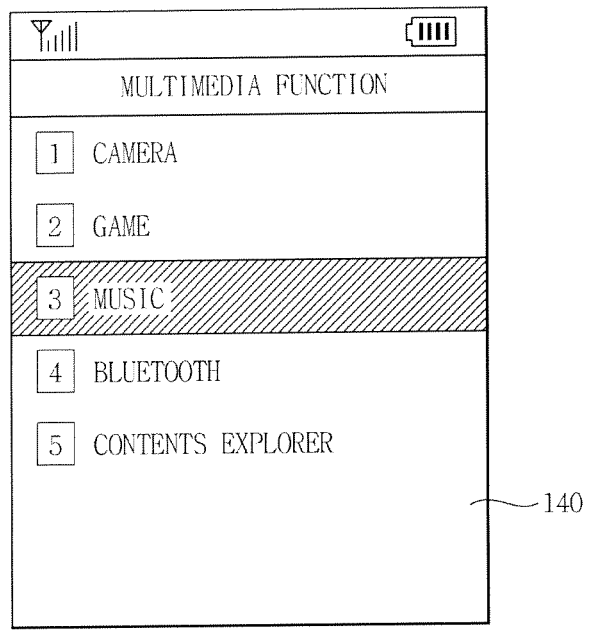
FIG. 3A through FIG. 3D are screen views which illustrate changing control information on the display unit of an electronic device according to the present invention.
Figure 3B:
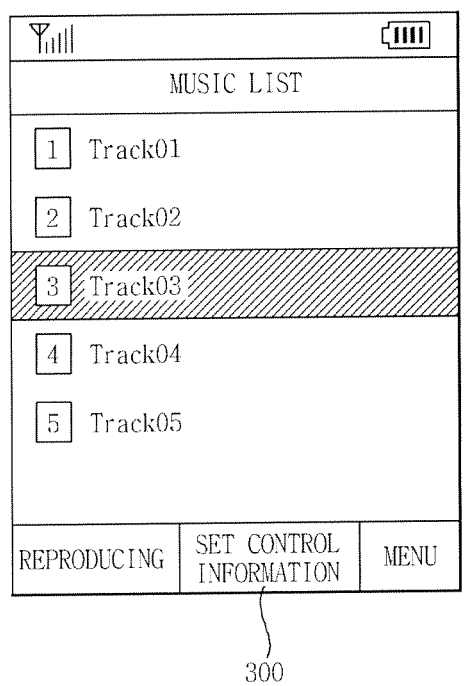

FIGS. 3A to 3D illustrate changing control information through an input unit. As shown in FIG. 3A, when an application '3. MUSIC' is selected from multimedia category menu "MULTIMEDIA FUNCTION" through the input unit 120 at step S200, the control unit 130 displays the selected application menu 'MUSIC LIST' on the display unit 140, as shown in FIG. 3B.

As shown in FIG. 3B, a list of a plurality of music applications or a play list, including a plurality of music files, is displayed at step S210. The application includes not only files executable through the mobile terminal 10, such as music files or image files, but also videos that can be displayed on the display unit 140 during video telephony. Although not shown in the FIG. 3B, the individual music applications or files may be displayed with control information, such as volume and sound effect mode set for the individual music applications or files.

As described above, a plurality of applications in the same category is controlled according to the same control information. The control information is information for the control unit 130 to control the electronic device when a corresponding application is executed. The control information may include a sound volume in case of a music application. For example, the control unit 130 may control the electronic device to reproduce five music files at volume of a numeral value '10'.

The control unit 130 confirms whether a control information setting menu 300 is selected for a specific music file, such as '3. Track 03', at step S220. Accordingly, the control unit 130 displays a user interface 305 on the display unit 140 to set the control information of the selected music file '3. Track 03' at step S230, as shown in FIG. 3C.

Accordingly, the control unit 130 individually changes the control information of the selected music file '3. Track 03,' making the control information of the music file '3. Track 03' different from control information of other applications.

Figure 3C:
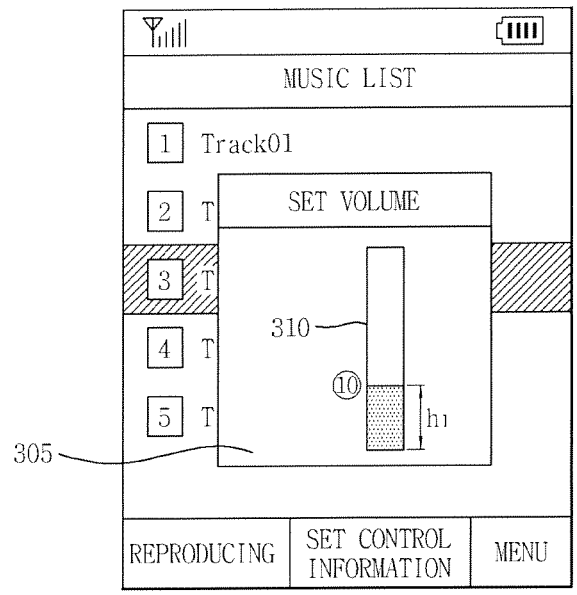

For example, as shown in FIG. 3C, a volume bar provided through the user interface 305 is set to have a numeral value '10' and a height h1 as default. In the present example, the default volume bar is referred as first control information and the first control information is applied identically or differently to a plurality of music files shown in FIG. 3B.

Figure 3D:
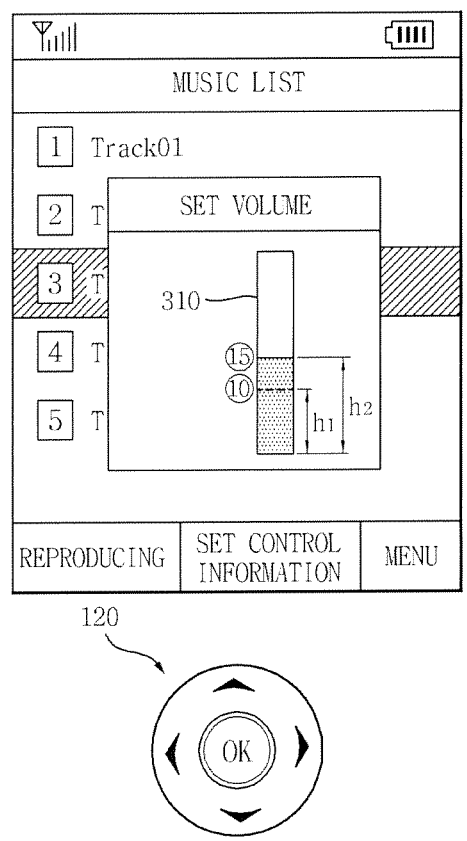

As shown in FIG. 3D, the numeral value '10' of the volume bar 310 may be changed to a numeral value '15' using an up direction key from a direction key of the input unit 120. In the present example, the changed information is referred as second control information and, accordingly, the height of the volume bar has been increased from h1 to h2 at step S240.

Figure 4A:
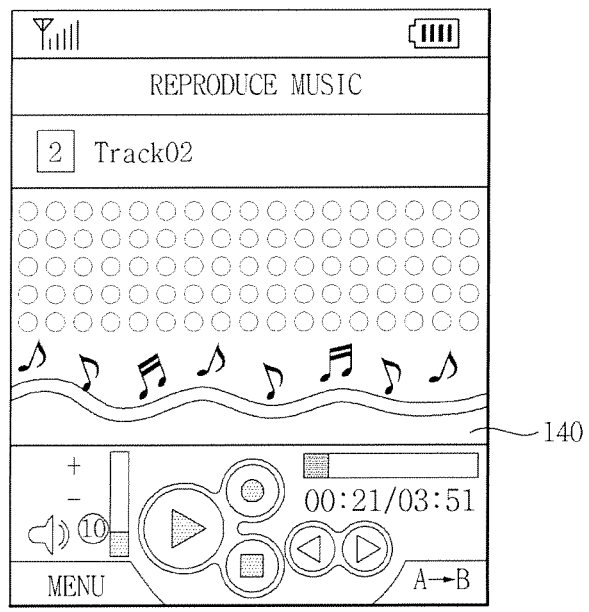
FIG. 4A through FIG. 4C are screen views on the display unit which illustrate reproducing a music file according to the control information set as shown in FIG. 3A through FIG. 3D.

After changing the control information of the selected music file '3. Track 03', a plurality of music applications may be executed. As shown in FIG. 4A, the control unit 130 checks whether a signal for reproducing a music file, such as 'Track 02', is generated through the input unit 120 at step S250. The control unit 130 reproduces the music file 'Track 02' at a default volume '10' at step S260.

Figure 4B:
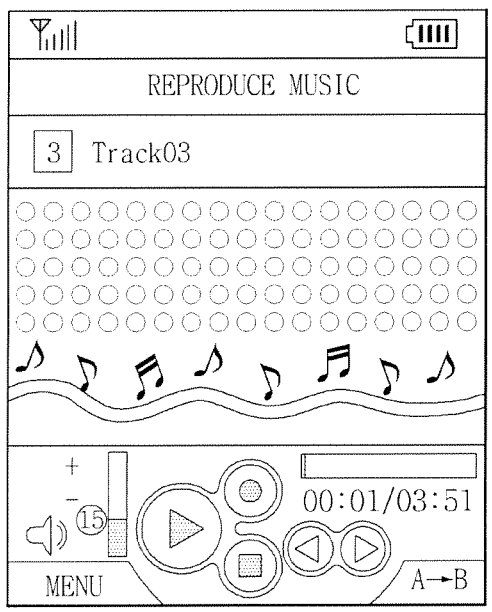
Figure 4C:
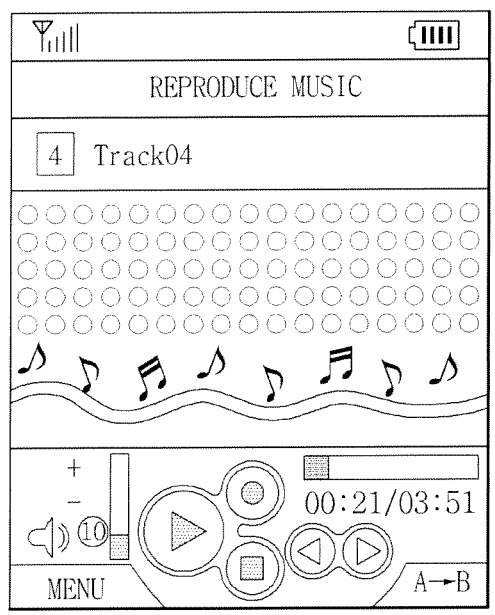

Once the reproduction of the music file 'Track 02' is finished, the control unit 130 reproduces the next music file 'Track 03' at volume '15' in response to the second control information described above, as shown in FIG. 4B. As shown in FIG. 4C, once the reproduction of the music file 'Track 03' is finished, the control unit 130 reproduces the next music file 'Track 04' at a default volume '10' again according to the first control information.

Another example of changing volume control information will be described with reference to FIGS. 5A and 5B. If a music file '3. Track 03' is selected through the input unit 120 as shown in FIG. 3B, the control unit 130 displays a user interface 305 on the display unit 140 to set control information for the music file '3. Track 03' as shown in FIG. 5A.

Figure 5A:
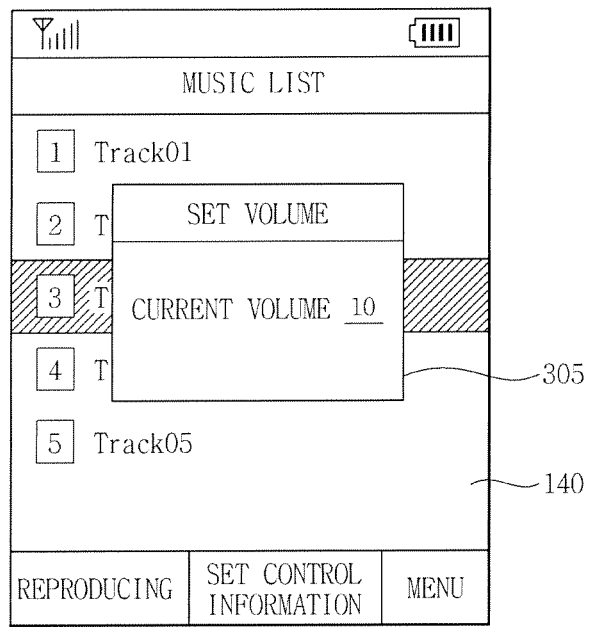
FIG. 5A and FIG. 5B are screen views on the display unit which illustrate changing control information by directly inputting control information according to the present invention.
Figure 5B:
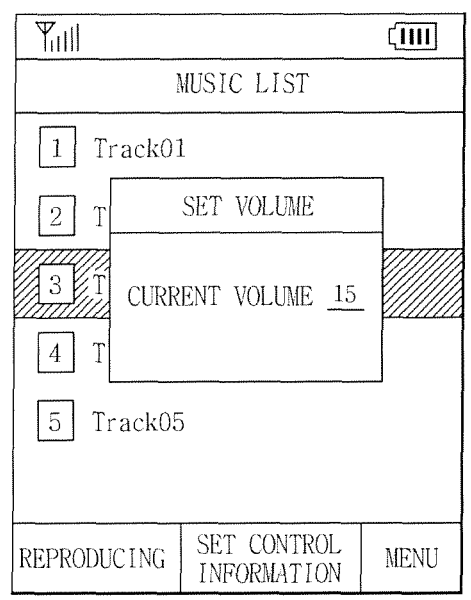
Figure 5B:
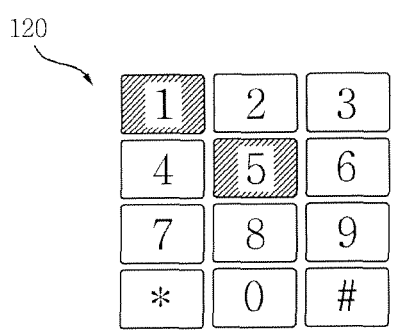

In the user interface 305 as shown in FIG. 5A, 'current volume 10' is displayed as a default volume of the music file '3. Track 03'. As shown in FIG. 5B, if a numeral value 15 is inputted as volume control information through the input unit in order to change the current default volume of the music file '3. Track 03', the control unit 130 stores the input control information to the memory unit 110.

Although the volume control has been used in the above examples to describe the method of changing the control information, the present invention is not so limited. The control information may be related to more than one information, and an example of changing more than one control information will be described hereinafter.

Figure 6A:
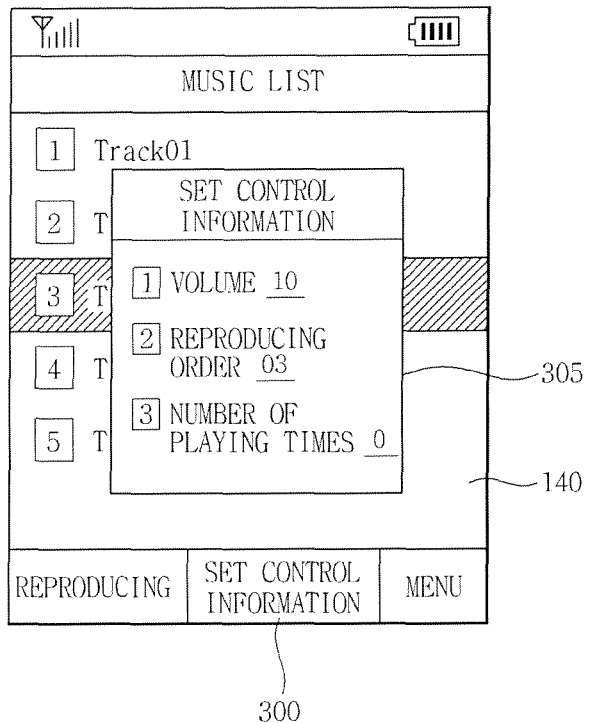
FIG. 6A and FIG. 6B are screen views on the display unit which illustrate inputting two or more control information according to the present invention.

As shown in FIG. 6A, a control information setting menu 300 for a music file '3. Track 03' is selected through the input unit 120 as described in FIG. 3B. Accordingly, the control unit 130 displays a user interface 305 on the display unit 140 to set control information of the music file '3. Track 03'.

Figure 6B:
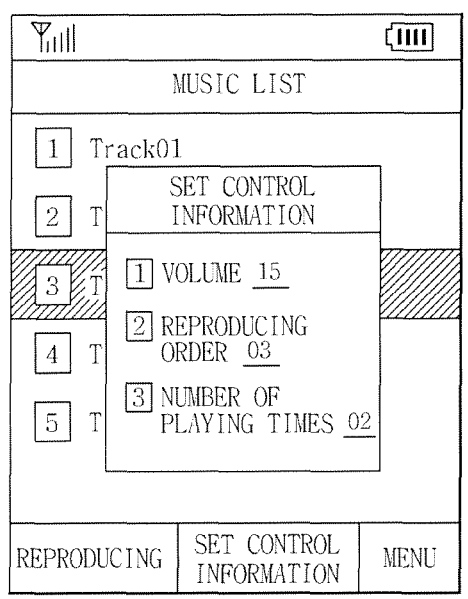

The control information displayed on the display unit 140 may be the volume, a reproducing order, and the number of playing times, and the default values of control information are displayed as first control information. If the control information '1. volume: 10, 3. number of playing times: 0' shown in FIG. 6A is changed to control information '1. volume: 15, 3. number of playing times: 2' through the input unit 120 as shown in FIG. 6B, the control unit 130 reproduces the music file '3. Track 03' according to the changed control information.

The application with the changed control information may be displayed to indicate that corresponding control information has been changed. An example of indicating the changed control information of the application is described with reference to FIG. 7.

Figure 7:
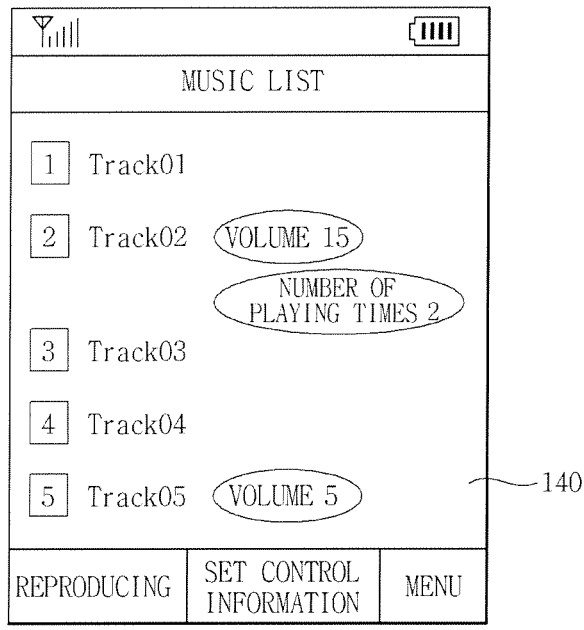
FIG. 7 is a screen view on the display unit showing that control information has been changed according to the present invention.

As shown in FIG. 7, the control unit 130 displays the changed information of applications when a list of music applications or 'MUSIC LIST' is displayed. For example, the control unit 130 displays, on the display unit 140, the control information of a music file '2. Track 02,' which has been changed to 'volume 15' and 'number of playing times 2', and the control information of music file '5. Track 05,' which has been changed to 'volume 5'. If no change has been made to the control information of the application, for example, music files '1. Track 01,' '3. Track 03,' and '4. Track 04,' the control information may not be displayed as shown in FIG. 7, or default information may be displayed (not shown).

Although the application has been described as the music file in the above examples, the present invention is not so limited. For example, the described method may be similarly applied to an image file. An example of changing control information of an image file is described with reference to FIGS. 8A to 8D.

Figure 8A:
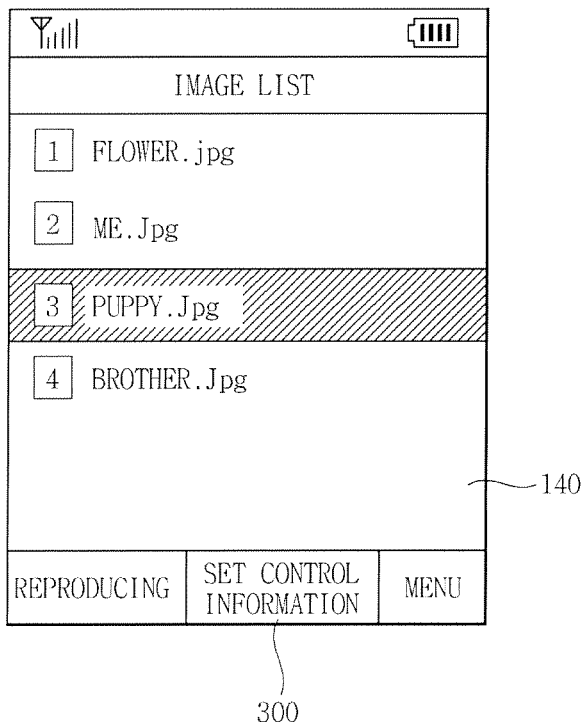
FIG. 8A through FIG. 8D are screen views on the display unit which illustrate changing control information of an image file according to the present invention.
Figure 8B:
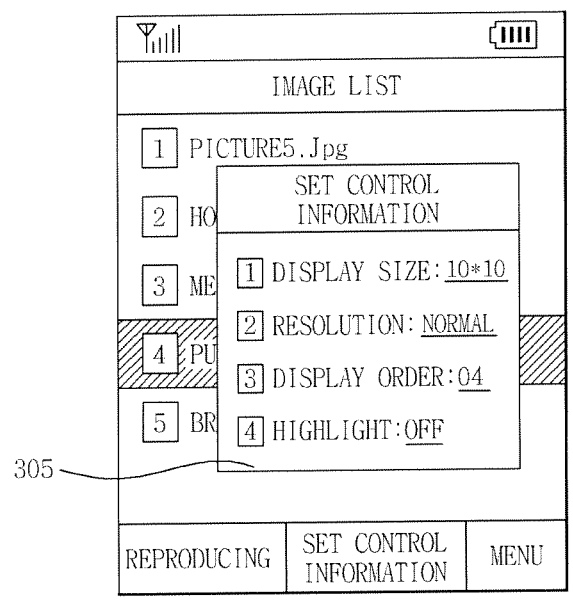

As shown in FIG. 8A, after displaying a list of image applications on the display unit 140 and selecting an image '3. puppy' through the input unit 120, a control information setting menu 300 is selected. As shown in FIG. 8B, the control unit 130 displays a user interface 305 on the display unit 140 to change the control information of the image '3. puppy' selected in FIG. 8A. The default control information may be control information set identically or differently to other images as described above.

Figure 8C:
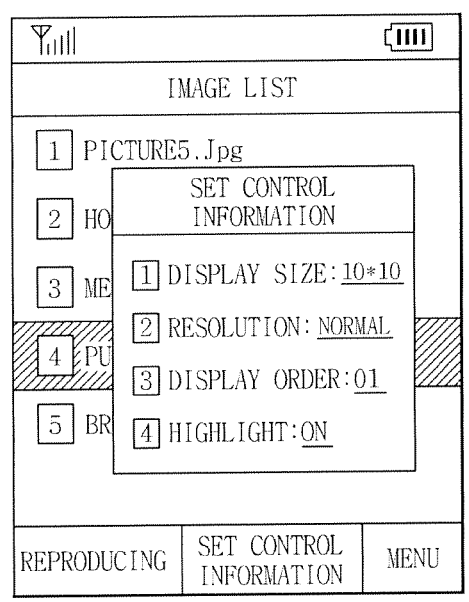
Figure 8D:
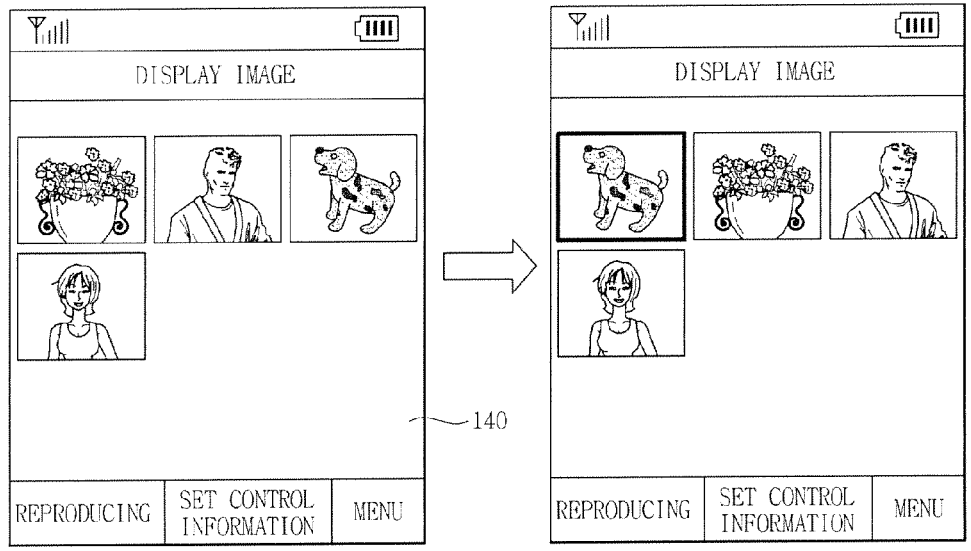

The default control information shown in FIG. 8B, '3. display order: 04, 4. highlight: OFF' is changed through the input unit 120 to '3. display order: 01, 4. highlight: ON,' as shown in FIG. 8C. Referring to FIG. 8D, according to the changed control information, the control unit 130 now displays images in an order of a puppy.jpg, a flower.jpg, a me.jpg, and a brother.jpg, rather than in the previous order of a flower.jpg, a me.jpg, a puppy.jpg, and a brother.jpg shown in FIG. 8A. As shown in the right panel of FIG. 8D, the control unit 130 highlights the border of the image displayed from the puppy.jpg. to indicate that the change of the control information has been completed.

The above described methods can be similarly applied to image files for video telephony. An example of changing control information of image files for video telephony is described with reference to FIGS. 9A to 9D.

Figure 9A:
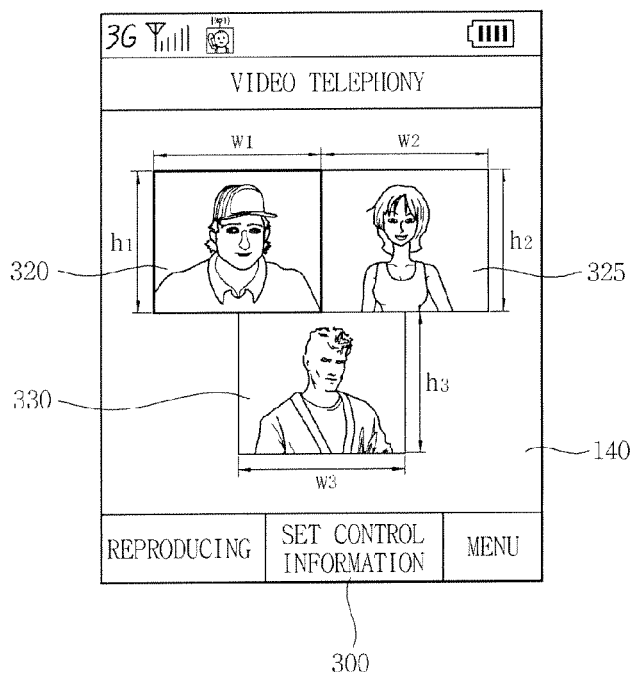
FIG. 9A through FIG. 9D are screen views on the display unit which illustrate changing control information of a display screen during video telephony according to the present invention.
Figure 9B:
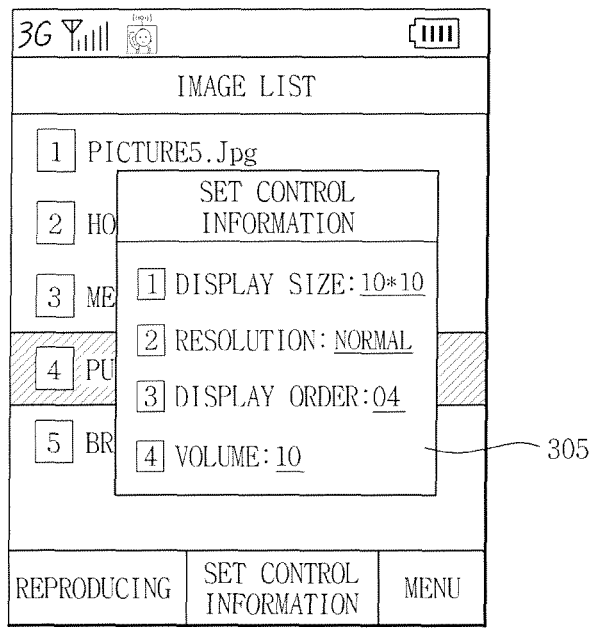

When a video telephony begins by transmitting and receiving video telephony data through the transmitting/receiving unit 100 as shown in FIG. 9A, the control unit 130 displays first party and second party images 320 and 325, and a caller image 330 on the display unit 140. The images 320, 325, and 330 are displayed to have the same widths w1, w2, and w3, and the same heights h1, h2, and h3. After selecting the first party image 320 through the input unit 120, a control information setting menu 300 is selected.

Figure 9C:
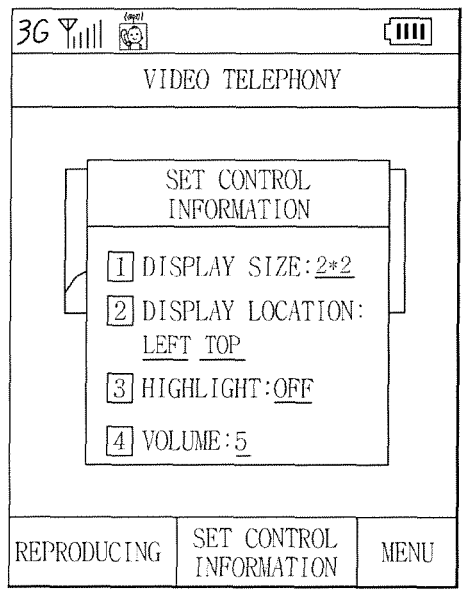
Figure 9D:
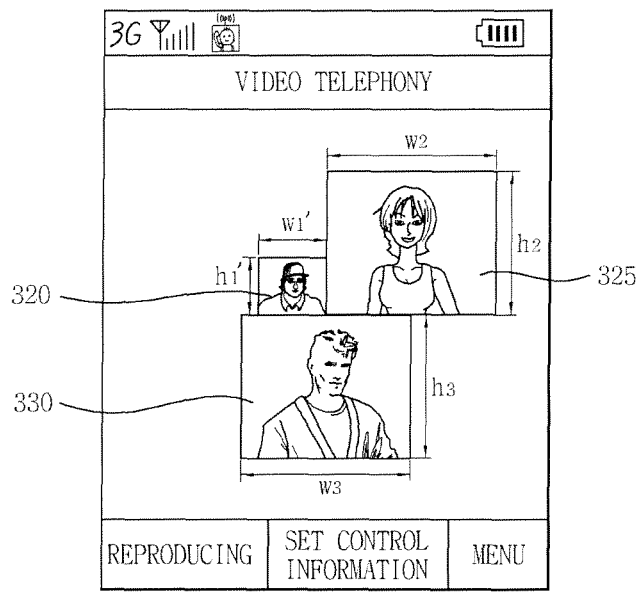

Accordingly, the control unit 130 displays a user interface 305 on the display unit 140 to change the control information of the first party image 320. For example, the control information shown in FIG. 9B, '1. screen size: 10*10, 4. volume: 10' is changed through the input unit 120 to control information '1. screen size: 2*2, 4. volume: 5' as shown in FIG. 9C. Accordingly, the control unit 130 displays the first party image 320 in a width w1' and a height h1' according to the changed information and displays the second party image 325 and the caller image 330 in a default screen size as shown in FIG. 9D.

Figure 10A:
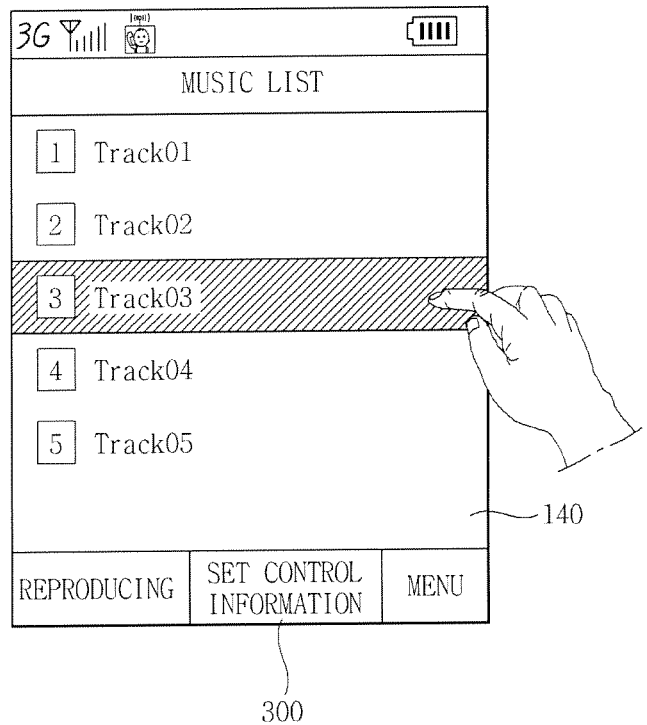
FIG. 10A through FIG. 10C are screen views which illustrate setting control information displayed on a touch screen according to the present invention.
Figure 10B:
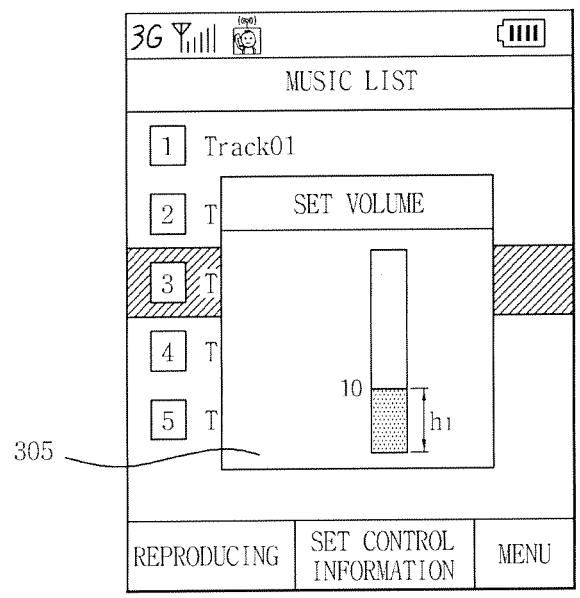
Figure 10C:
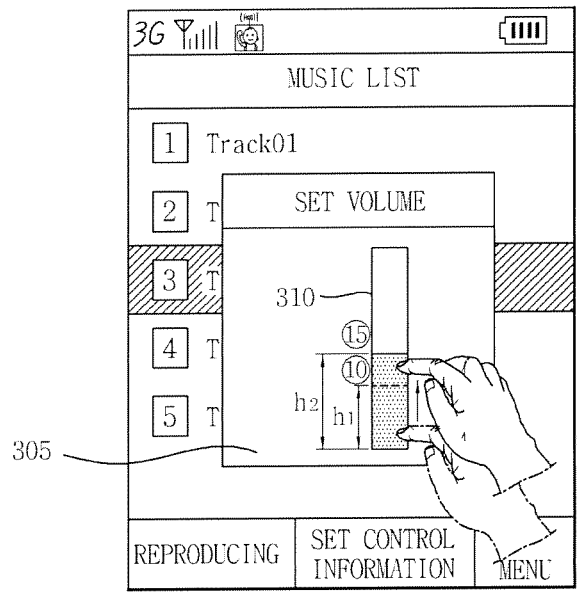

FIGS. 10A to 10C illustrate changing control information through a touch screen. As shown in FIG. 10A, the display unit 140 may be embodied as a touch screen. A list of music applications is displayed on the touch screen. After selecting a music file '3. Track 03', a control information setting menu 300 is selected.

In response to the selection of the control information setting menu 300, the control unit 130 displays a user interface 305 'SET VOLUME' on the touch screen to change the control information of the selected music file '3. Track 03' as shown in FIG. 10B. As shown in FIG. 10C, a user touches and drags a height h1 of a volume bar 310 displayed as the user interface 305 from a height h1 to a height h2 in order to change the control information, specifically the volume, from 10 to 15.

Figure 11A:
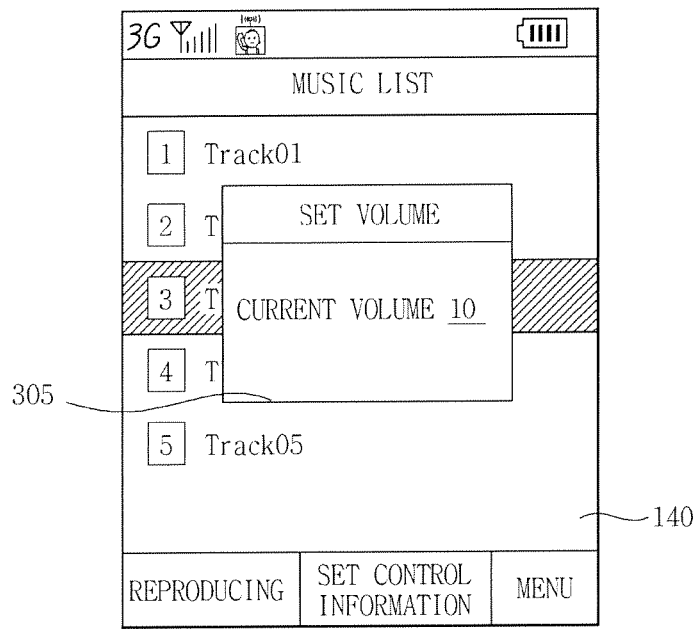
FIG. 11A and FIG. 11B are screen views on the display unit which illustrate setting control information on a touch screen by directly inputting control information according to the present invention.
Figure 11B:
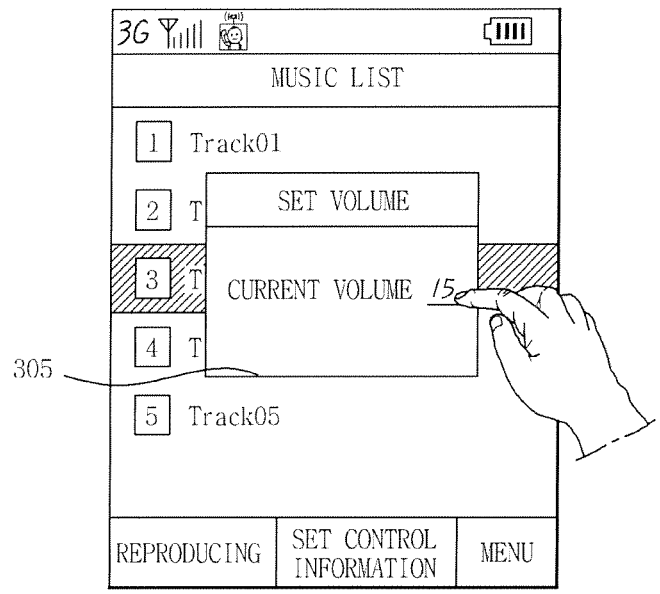

Another method of setting control information using a touch screen is described with reference to FIGS. 11A and 11B. When 'current volume 10' is displayed in the user interface 305 displayed on the display unit 140 as shown in FIG. 11A, a user may change the control information by inputting a numeral value of 15 by touching, specifically, writing with a finger or a stylus, directly on the user interface 305 as shown in FIG. 11B.

The control information may also be changed through a predetermined indicator. An example of changing control information using a predetermined indicator is described with reference to FIGS. 12A and 12B.

Figure 12A:
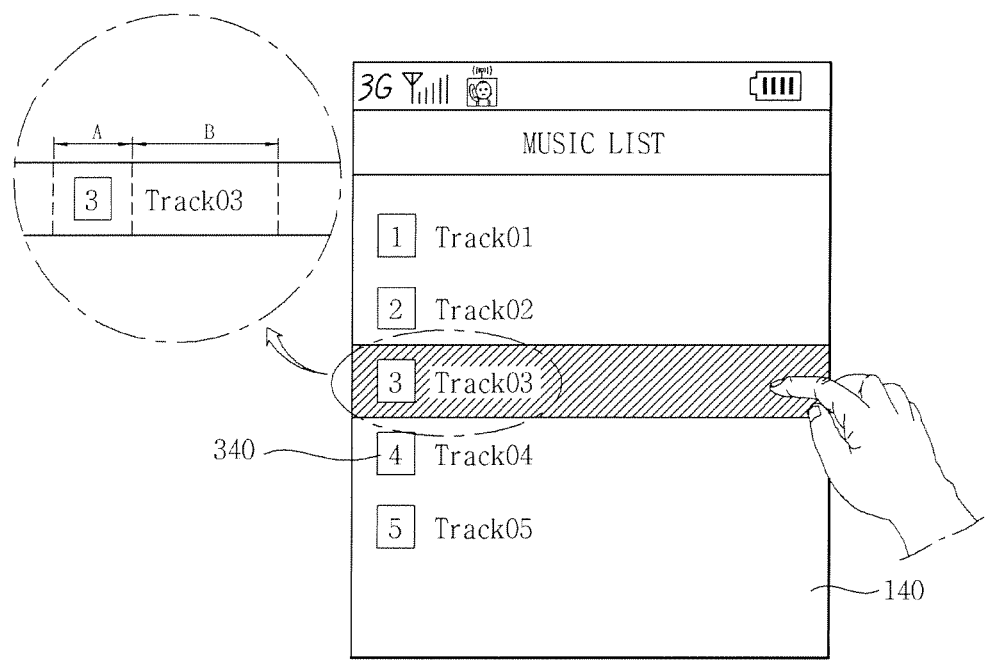
FIG. 12A and FIG. 12B are screen views on the display unit which illustrate setting control information on a touch screen according to one embodiment of the present invention.

As shown in FIG. 12A, a list of music applications is displayed on a touch screen. The control unit 130 displays an indicator 340 corresponding to each application. The indicator 340 may be displayed as an icon. For example, an indicator 340 '1' corresponds to a music file 'Track 01', an indicator '2' corresponds to a music file 'Track 02', an indicator '3' corresponds to a music file 'Track 03, an indicator '4' corresponds to a music file 'Track 04', and an indicator '5' corresponds to a music file 'Track 05'.

As shown in FIG. 12A, either an indicator area A or an application area B may be individually touched. If a user touches the indicator area A, a corresponding indicator is selected, and if the user touches the application area B, a corresponding application is selected. For example, if a music file 'Track 03' is selected by touching the music file 'Track 03' in the application area B, the music file 'Track 03' is reproduced.

Figure 12B:
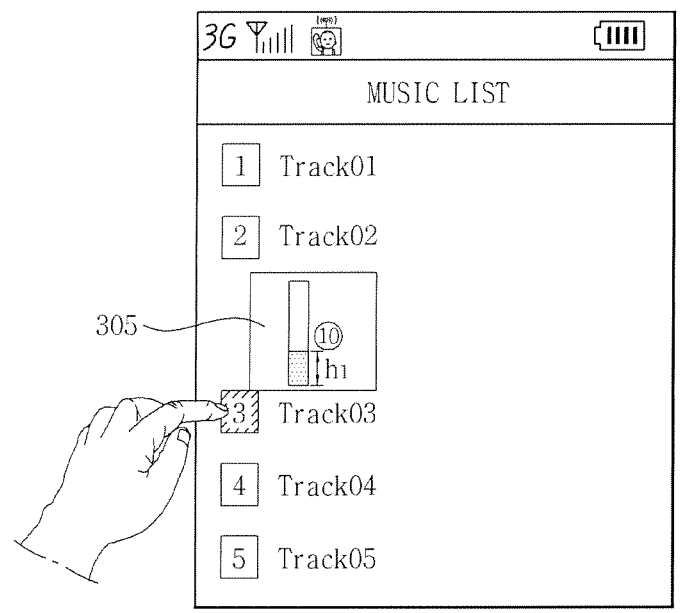

In FIG. 12B, when the indicator 340 '3' located in an indicator area A corresponding to the music file 'Track 03' is selected, the control unit 130 displays a user interface 305 adjacent to the indicator 340 '3' to change the control information of the music file 'Track 03'. The user interface 305 may overlap with the indicator 340 '3'. As shown in FIG. 10C, the control information may be changed through touching and dragging the bar shown in the user interface 305.

Figure 13A:
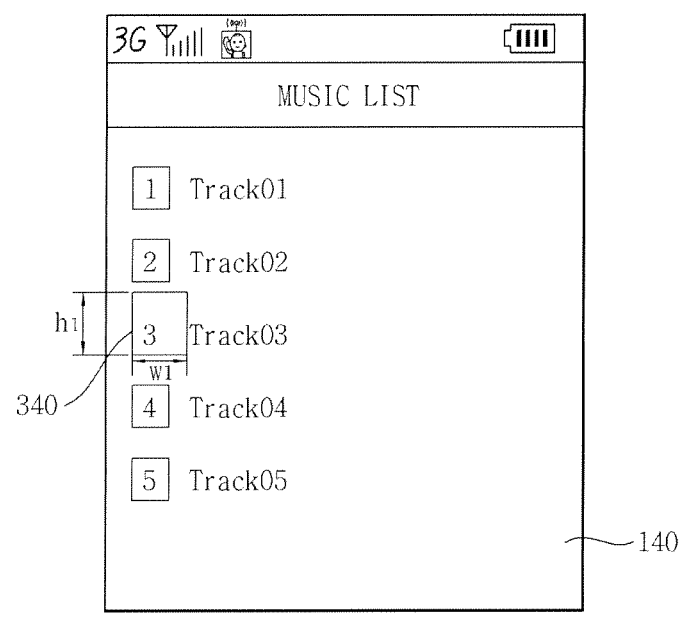
FIG. 13A and FIG. 13B are screen views on the display unit which illustrate setting control information by changing the size of an indicator displayed on a touch screen according to the present invention.
Figure 13B:
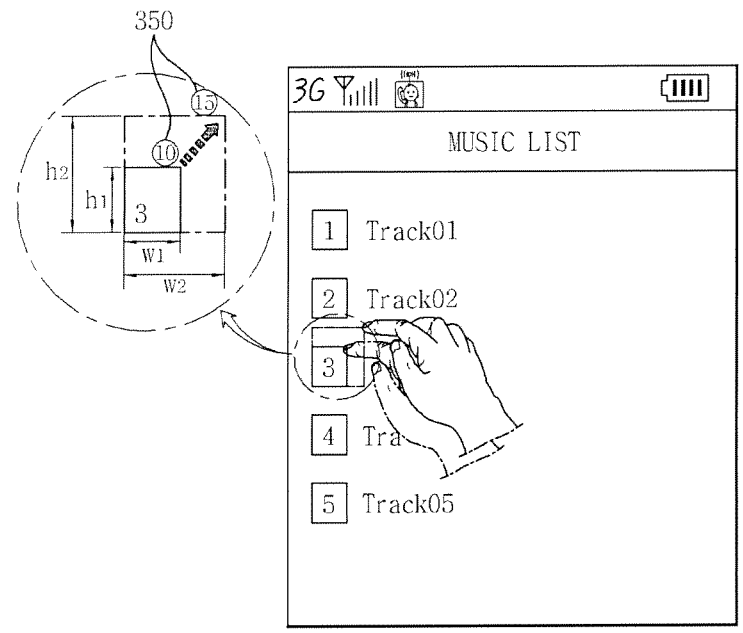

The control unit 130 enables a user to change control information through a corresponding indicator 340 when the indicator 340 is selected as illustrated in FIGS. 13A and 13B. As shown in FIG. 13A, if the indicator 340 '3' is selected, the control unit 130 enlarges a display size to have a first width w1 and a first height h1 in order to enable a user to easily touch the corresponding indicator 340.

If the user touches and drags the indicator 340 '3' in a predetermined direction as shown in FIG. 13B to increase the display size to a second width w2 and a second height h2, the control unit 130 increases the control information according to the dragged distance. The control unit 130 may display a guide 350 to allow increasing the amount of the control information according to the touching and dragging by the user.

Figure 14A:
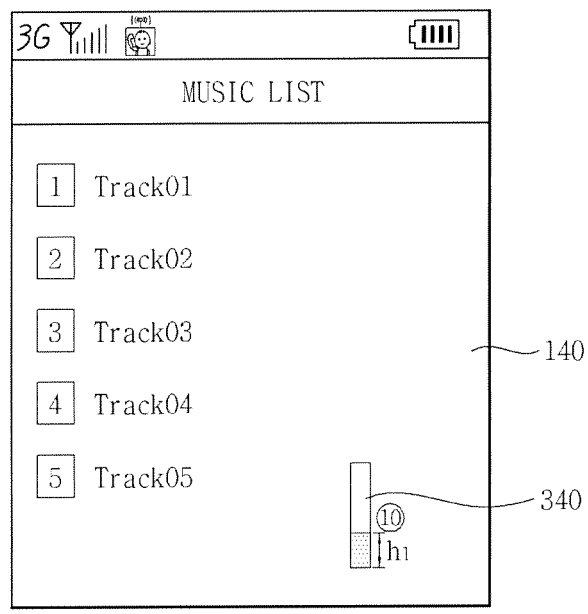
FIG. 14A and FIG. 14B are screen views on the display unit which illustrate changing control information when an indicator is displayed according to the present invention.
Figure 14B:
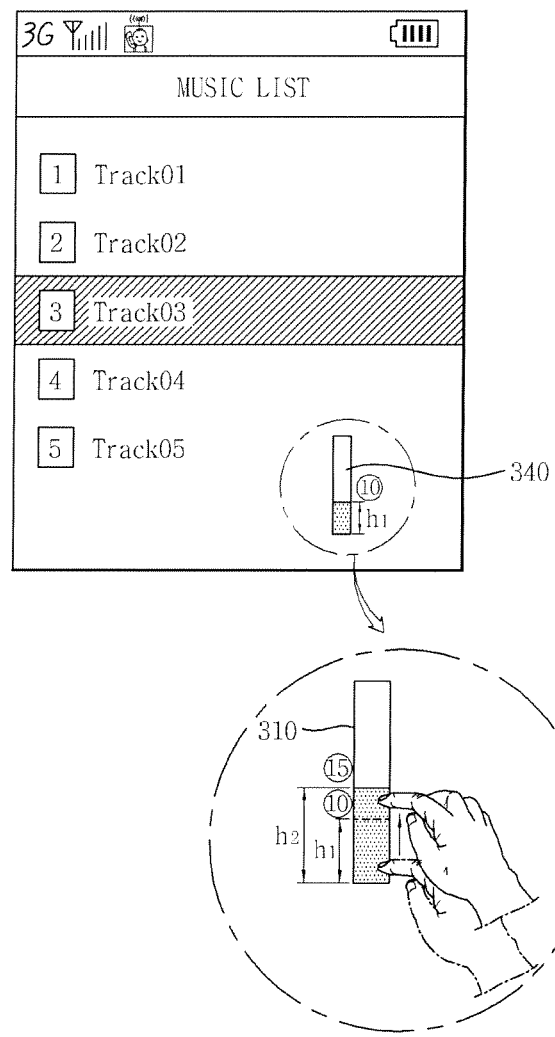

Only one indicator 340 may be displayed and used on the display unit 140 as illustrated in FIGS. 14A and 14B. As shown in FIG. 14A, the control unit 130 may display one indicator 340 on a touch screen. The indicator 340 in FIG. 14A has a form of a volume bar. As shown in FIG. 14B, the indicator 340 is dragged by touching the indicator after selecting a music file 'Track 03' on the touch screen and the control information is changed according to the dragged distance.

Figure 15:
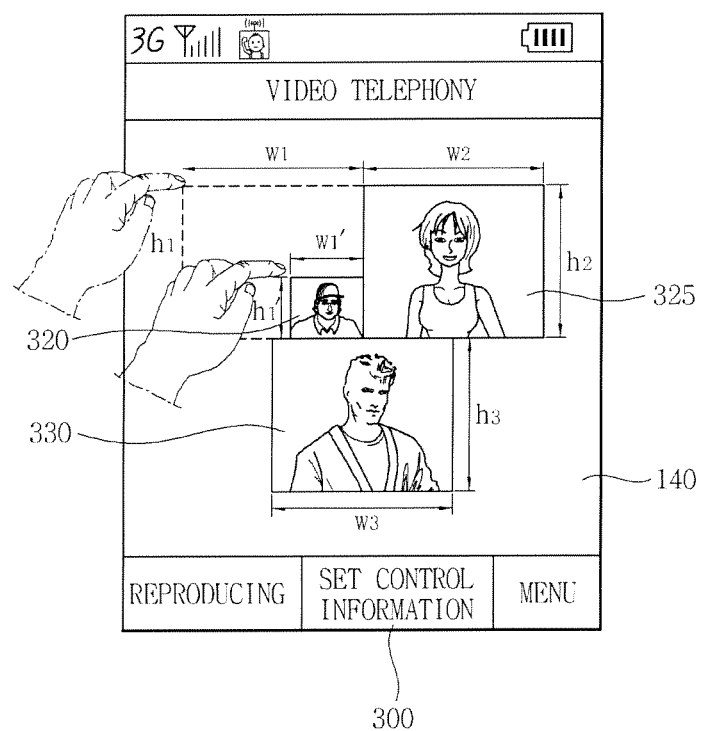
FIG. 15 is a screen view on the display which illustrates changing control information on a touch screen during video telephony according to the present invention.

The control information may also be set without using additional control menu during video telephony as illustrated in FIG. 15. As shown in FIG. 15, the first party and second party images 320 and 325, and a caller image 330 are displayed on a touch screen when a video telephony begins.

The widths w1, w2, and w3, and the heights h1, h2, and h3 of the images 320, 325, and 330, respectively, are set to be identical or different in the default control information setting. In FIG. 15, initially the first party image 320 has a width w1' and a height h1'. To enlarge the initially displayed size of the first party image 320 to the default size, the first party image is touched and dragged in a predetermined direction, thereby enlarging the displayed size to a width w1 and a height h1. Accordingly, the control unit 130 controls the size of the first party image 320 according to the newly set control information.

All of the above mentioned settings of the control information may be changed according to the setting by a user, or more than two control information can be set at the same time. Specifically, if the indicator 340 or the images are touched and dragged in up and down directions, one of the control information is changed, and if the indicator 340 or the images are touched and dragged in left and right directions, another control information is changed.

For example, if a predetermined indicator 340 is touched and dragged in up and down directions among various indicators, the volume of a corresponding application is changed and if the predetermined indicator 340 is dragged in left and right directions, the corresponding application is reproduced at predetermined times. On the other hand, if a predetermined indicator 340 is touched and dragged in up and down directions, the volume of a corresponding application is increased and if the predetermined indicator 340 is dragged in left and right directions, the volume is reduced.

The indicator 340 may be an icon formed as a symbol, a drawing, or a picture. If a plurality of predetermined applications is selected, control information changed through a predetermined indicator of one selected application may be applied identically or similarly to other selected applications.

Although the mobile terminal 10 was described as the electronic device, the present invention is not so limited. The present method may be identically or similarly applied to other types of electronic devices, such as an MP3 player.

The control information may also be displayed information that includes at least one of a display size, a displaying type, and a resolution. The sound information may include the volume or a sound effect mode, such as an equalizer including jazz, classical, pop, vocal, and live, and stereo and mono. The order information may include the number of playing times, an order in a reproduction list, or information regarding whether a predetermined application is reproduced. The control information may be set or modified by the user.

As described above, the electronic device and the method of executing application according to the present invention provide several advantages. First, a plurality of applications can be individually set. Therefore, each application may be personalized according to the user's preference by storing control information of individual applications. Second, the control information can be easily set by the user, using the simple user interface.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for setting control information in an electronic device, the method comprising:
   displaying a list of a plurality of media items, each of the plurality of media items associated with individually adjustable first control information, wherein the list of the plurality of media items includes a plurality of indicators, each of the plurality of indicators associated with a corresponding one of the plurality of media items;
   adjusting a size of an indicator associated with a specific media item of the plurality of media items in response to a first touch input that is received at a first area at which the indicator is displayed, wherein the first control information is adjusted according to a change in the size of the indicator;
   in response to a second touch input that is received at the indicator having the adjusted size, displaying a control region for receiving a third touch input to adjust the first control information associated with the specific media item; and
   associating the specific media item with second control information comprising the adjusted first control information adjusted according to the third touch input that is received at the control region,
   wherein the specific media item is executed according to the second control information and a remainder of the plurality of media items corresponding to unadjusted first control information are executed according to the first control information.

2. The method of claim 1, wherein the indicator comprises a symbol, a drawing, or a picture.

3. The method of claim 1, wherein the first touch input comprises dragging the indicator in a predetermined direction and the size of the indicator is adjusted according to a dragged distance of the indicator.

4. The method of claim 3, wherein the predetermined direction comprises up and down directions.

5. The method of claim 1, wherein the adjusted second control information differs from a default control parameter set in the electronic device.

6. The method of claim 1, wherein the second control information comprises at least display information or sound information of the specific media item.

7. The method of claim 6, wherein:
   the display information comprises a display size, a display type, and a resolution; and
   the sound information comprises a volume and a sound effect mode.

8. The method of claim 1, further comprising saving the adjusted second control information.

9. An electronic device, comprising:
   a touch screen; and
   a control unit configured to:
      cause the touch screen to display a list of a plurality of media items, each of the plurality of media items associated with individually adjustable first control information, the plurality of media items being controlled by the first control information, wherein the list of the plurality of media items includes a plurality of indicators, each of the plurality of indicators associated with a corresponding one of the plurality of media items;
      adjust a size of an indicator associated with a specific media item of the plurality of media items in response to a first touch input that is received at a first area at which the indicator is displayed, wherein the first control information is adjusted according to a change in the size of the indicator;
      in response to a second touch input that is received at the indicator having the adjusted size, cause the touch screen to display a control region for receiving a third touch input to adjust the first control information associated with the specific media item; and
      associate the specific media item with second control information comprising the adjusted first control information adjusted according to the third touch input that is received at the control region,
   wherein the specific media item is executed according to the second control information and a remainder of the plurality of media items corresponding to unadjusted first control information are executed according to the first control information.

10. The electronic device of claim 9, further comprising:
    a memory unit configured to store the control information associated with each of the plurality of media items.

11. The electronic device of claim 9, wherein each of the plurality of media items is reproduced according to default control information if the associated adjustable first control information is not adjusted.

12. The electronic device of claim 9, wherein:
    the controller is further configured to:
       recognize a fourth touch input received at a second area; and
       reproduce the specific media item according to the adjusted control information associated with the specific media item in response to the fourth touch input; and
    the second area is an application area corresponding to the specific media item.

13. The method of claim 1, further comprising:
    receiving a fourth touch input at a second area; and
    reproducing the specific media item according to the adjusted control information associated with the specific media item in response to the fourth touch input, wherein the second area is an application area corresponding to the specific media item.

14. The method of claim 1, wherein the plurality of media items comprise at least an image file or an audio file.

* * * * *